United States Patent
Lee et al.

(10) Patent No.: US 10,321,273 B2
(45) Date of Patent: Jun. 11, 2019

(54) METHOD AND APPARATUS FOR TRANSMITTING A WARNING MESSAGE BY USING V2X SERVICES IN A WIRELESS ACCESS SYSTEM

(71) Applicant: LG ELECTRONICS INC., Seoul (KR)

(72) Inventors: Ki-Dong Lee, Seoul (KR); Sang Gook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/766,727

(22) PCT Filed: Oct. 6, 2016

(86) PCT No.: PCT/KR2016/011200
§ 371 (c)(1),
(2) Date: Apr. 6, 2018

(87) PCT Pub. No.: WO2017/061795
PCT Pub. Date: Apr. 13, 2017

(65) Prior Publication Data
US 2018/0295474 A1    Oct. 11, 2018

Related U.S. Application Data

(60) Provisional application No. 62/238,080, filed on Oct. 6, 2015.

(51) Int. Cl.
*H04W 4/02* (2018.01)
*H04W 4/90* (2018.01)
(Continued)

(52) U.S. Cl.
CPC ........... *H04W 4/027* (2013.01); *H04W 4/046* (2013.01); *H04W 4/90* (2018.02); *H04W 4/40* (2018.02)

(58) Field of Classification Search
CPC ....... H04W 4/04; H04W 4/046; H04W 4/024; H04W 4/025; H04W 74/0816; H04W 4/40; H04W 4/42; H04W 4/44; H04W 4/46
See application file for complete search history.

(56) References Cited

U.S. PATENT DOCUMENTS

2013/0279392 A1* 10/2013 Rubin ................. H04W 72/005
370/312
2014/0062685 A1    3/2014 Tamatsu et al.
(Continued)

FOREIGN PATENT DOCUMENTS

| JP | 2002092781 | 3/2002 |
| JP | 2009123249 | 6/2009 |
| KR | 1020140046953 | 4/2014 |

OTHER PUBLICATIONS

PCT International Application No. PCT/KR2016/011200, International Search Report dated Jan. 25, 2017, 7 pages.
(Continued)

*Primary Examiner* — Jean A Gelin
(74) *Attorney, Agent, or Firm* — Lee, Hong, Degerman, Kang & Waimey

(57) ABSTRACT

The present invention provides methods and apparatus for transmitting and receiving warning messages by using Vehicle to Everything (V2X) services. One of embodiments of the present invention is performed by a vehicle user equipment (VUE) and comprising steps of receiving a first Message transmission Guideline Package (MGP) message including geographical coordination information related with an MGP area and a value tag indicating time information for updating the MGP message; checking the value tag is changed or not; and transmitting a first warning message based on the first MGP message when the value tag is not expired; or transmitting a second warning message based on
(Continued)

a second MGP message when the value tag is expired, wherein at least a transmission frequency or a transmission power for the second warning message are determined base on the second MGP message, and wherein the MGP area represents where MGP profiles are the same.

14 Claims, 9 Drawing Sheets

(51) Int. Cl.
*H04W 4/04* (2009.01)
*H04W 4/40* (2018.01)

(56) References Cited

U.S. PATENT DOCUMENTS

| | | | |
|---|---|---|---|
| 2017/0018187 A1* | 1/2017 | Kim | G08G 1/166 |
| 2018/0302202 A1* | 10/2018 | Kim | H04L 5/00 |
| 2018/0310147 A1* | 10/2018 | Kim | H04W 4/06 |

OTHER PUBLICATIONS

Anaya, J. et al., "Vehicle to Pedestrian Communications for Protection of Vulnerable road Users", IEEE Intelligent Vehicles Symposium, Jun. 2014, 7 pages.

European Patent Office Application Serial No. 16853911.2, Search Report dated Feb. 11, 2019, 7 pages.

3rd Generation Partnership Project (3GPP), "Technical Specification Group Services and System Aspects; Study on LTE Support for V2X Services (Release 14)," 3GPP TR 22.885 V1.0.0, XP051011806, Sep. 2015, 42 pages.

* cited by examiner (a) Control-Plane Protocol Stack (b) User-Plane Protocol Stack (a)

(b)

(c)

METHOD AND APPARATUS FOR TRANSMITTING A WARNING MESSAGE BY USING V2X SERVICES IN A WIRELESS ACCESS SYSTEM

CROSS-REFERENCE TO RELATED APPLICATIONS

This application is the National Stage filing under 35 U.S.C. 371 of International Application No. PCT/KR2016/011200, filed on Oct. 6, 2016, which claims the benefit of U.S. Provisional Application No. 62/238,080, filed on Oct. 6, 2015, the contents of which are all hereby incorporated by reference herein in their entirety.

TECHNICAL FIELD

The present invention relates to a wireless access system, and more particularly, to methods and apparatus for transmitting warning messages by using Vehicle to Everything (V2X) services.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

The object of the present invention is to provide methods for supporting V2X services.

Another object of the present invention is to provide methods for transmitting warning notifications in order to protect pedestrians and/or drivers from collisions under a V2X environment.

Still another object of the present invention is to define a Message transmission Guideline Package (MGP) message will be used for the warning notifications.

Still another object of the present invention is to provide methods how to calculate the transmission power and the transmission frequency of the warning messages.

Still another object of the present invention is to provide methods how to update the MGP message by using a value tag.

Still another object of the present invention is to provide a vehicle user equipment (VUE) and/or an apparatus for supporting the above-described methods.

Technical problems to be solved by the present invention are not limited to the above-mentioned technical problem, and other technical problems not mentioned above can be clearly understood by one skilled in the art from the following description.

Technical Solution

The present invention provides methods and apparatus for transmitting and receiving warning messages by using Vehicle to Everything (V2X) services.

In one aspect of the present invention, a method for transmitting a warning message in a wireless access system supporting a Vehicle to Everything (V2X) service, the method performed by a vehicle user equipment (VUE) and comprising steps of receiving a first Message transmission Guideline Package (MGP) message including geographical coordination information related with a MGP area and a value tag indicating time information for updating the MGP message; checking the value tag is changed or not; and transmitting a first warning message based on the first MGP message when the value tag is not expired; or transmitting a second warning message based on a second MGP message when the value tag is expired, wherein at least a transmission frequency or a transmission power for the second warning message are determined base on the second MGP message, and wherein the MGP area represents where MGP profiles are the same.

In another aspect of the present invention, a vehicle user equipment (VUE) for transmitting a warning message in a wireless access system supporting a Vehicle to Everything (V2X) service, the VUE comprising a receiver, a transmitter, and a processor controls the receiver and the transmitter to transmit the warning message. Wherein the processor is configured to: control the receiver to receive a first Message transmission Guideline Package (MGP) message including geographical coordination information related with a MGP area and a value tag indicating time information for updating the MGP message, check the value tag is changed or not, and control the transmitter to transmit a first warning message based on the first MGP message when the value tag is not expired; or control the transmitter to transmit a second warning message based on a second MGP message when the value tag is expired, wherein at least a transmission frequency or a transmission power for the second warning message are determined base on the second MGP message, and wherein the MGP area represents where MGP profiles are the same.

The VUE may check its location is in a serving network or not, and the second warning message may be transmitted based on a most recently stored MGP message, when the VUE is out of a coverage of the serving network and the value tag is not expired.

The MGP message may further include a velocity range class information representing a velocity range class classified according to a velocity of a VUE, a statistic indication indicating whether the MGP area is densely populated area or not based on statistic information, and a live indication indicating whether that MGP area is dense or not now.

In this case, the at least the transmission power and the transmission frequency is determined according to the velocity range class information in consideration of a velocity of the VUE.

The VUE may transmit a detailed MGP (D-MGP) request message including at least location information or trajectory information of the VUE, and the second MGP message may be a D-MGP message including geographical coordination information related with a MGP sub-area and a new value tag.

The transmission frequency may be calculated based on a velocity of the VUE and a velocity of another VUE or a pedestrian UE (PUE).

In addition, the transmission power may be calculated by using a velocity of the VUE, a velocity of another VUE or a pedestrian UE (PUE), a transmission power of the another VUE or the PUE, a path loss exponent parameter, and a a proportional coefficient parameter.

The VUE may transmit a Thank you message indicating what aspect of the first or the second warning messages is helpful or not helpful.

The above embodiments are part of preferred embodiments of the present invention. Obviously, it is to be understood to those having ordinary knowledge in the art that various embodiments having the technical features of the present invention can be implemented on the detailed description of the present invention as set forth herein.

Advantageous Effects

According to exemplary embodiments of the present invention, the following advantages can be obtained.

Firstly, it is possible to provide methods for supporting V2X services.

Secondly, it is possible to provide methods for transmitting warning notifications in order to protect pedestrians and/or drivers from collisions under a V2X environment.

In addition, by using the embodiments of the present invention, road safety of the PUE and the VUE can be increased and traffic efficiency can be enhanced.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiments of the invention and together with the description served to explain the principle of the invention. In the drawings.

MODE FOR INVENTION

Figure 1:
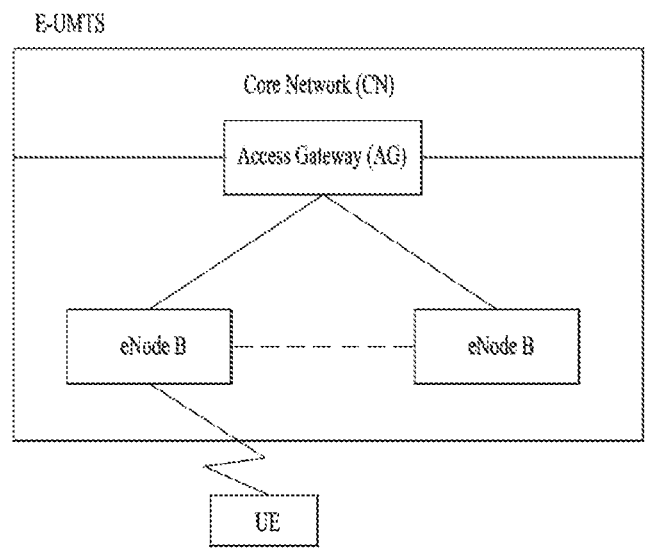
FIG. 1 illustrates a schematic structure a network structure of an evolved universal mobile telecommunication system (E-UMTS)

Exemplary embodiments of the present invention provide a method and apparatus for transmitting warning messages by using Vehicle to Everything (V2X) services.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood by those skilled in the art will not be described either.

In the embodiments of the present invention, a description has been mainly made of a data transmission and reception relationship between an enhance Node B (eNB) and a user equipment (UE). The eNB refers to a terminal node of a network, which directly or indirectly communicates with a UE. A specific operation described as being performed by the eNB may be performed by an upper node of the eNB.

Namely, it is apparent that, in a network comprised of a plurality of network nodes including the eNB, various operations performed for communication with a UE may be performed by the eNB, or network nodes other than the eNB. The term 'eNB' may be replaced with a fixed station, an ABS (Advanced Base Station), an MME (Mobility Management Entity), or a RSU (Road Side Unit) etc. Especially, it should be noted that the terms 'eNB' and 'eNode-B' are used interchangeably and the terms 'VUE', 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an UE may serve as a transmitter and an eNB (or NB) may serve as a receiver, on uplink. Likewise, the UE may serve as a receiver and the eNB (or NB) may serve as a transmitter, on downlink.

The embodiments of the present invention are supported by standard documents disclosed for at least one of wireless access systems including a 3GPP system, and a 3GPP LTE system. In particular, the embodiments of the present invention are supported by 3GPP TR 22.885, 3GPP TS 22.185, 3GPP TS 36.211, 3GPP TS 36.212, 3GPP TS 36.213, 3GPP TS 36.321, 3GPP TS 36.331, and 3GPP TR 36.885 documents. The steps or parts, which are not described to clearly reveal the technical features of the present invention, in the embodiments of the present invention may be supported by the above documents. All terms used in the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to aid in understanding of the present invention. These specific terms may be replaced with other terms within the scope and spirit of the present invention.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access).

CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA).

UTRA is part of a UMTS (Universal Mobile Telecommunications System). 3GPP LTE is a part of Evolved UMTS (E-UMTS), which uses E-UTRA. 3GPP LTE employs OFDMA on downlink and uses SC-FDMA on uplink. LTE-A (Advanced) is an evolved version of 3GPP LTE. The following embodiments of the present invention mainly describe examples of the technical characteristics of the present invention as applied to the 3GPP LTE/LTE-A systems.

1. An Overall of 3GPP LTE/LTE-A Systems

In a wireless access system, a UE receives information from a BS through a downlink and transmits information to the BS through an uplink. Information transmitted and received between the UE and the BS includes general data information and control information. A variety of physical channels are provided according to type/use of information transmitted and received between the UE and the BS.

1.1 System Architecture

FIG. 1 illustrates a schematic structure a network structure of an evolved universal mobile telecommunication system (E-UMTS). An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network". In these days, an evolved system of the 3GPP LTE has been appeared and it is referred as 3GPP LTE-A (3GPP LTE advanced) system. Details of the technical specifications of the 3GPP LTE-A system are referred to Releases 9 to 12.

Referring to FIG. 1, the E-UMTS mainly includes a User Equipment (UE), base stations (or eNBs or eNode Bs), and an Access Gateway (AG) which is located at an end of a network (e.g., E-UTRAN) and which is connected to an external network. Generally, an eNB can simultaneously transmit multiple data streams for a broadcast service, a multicast service and/or a unicast service.

The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs.

A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
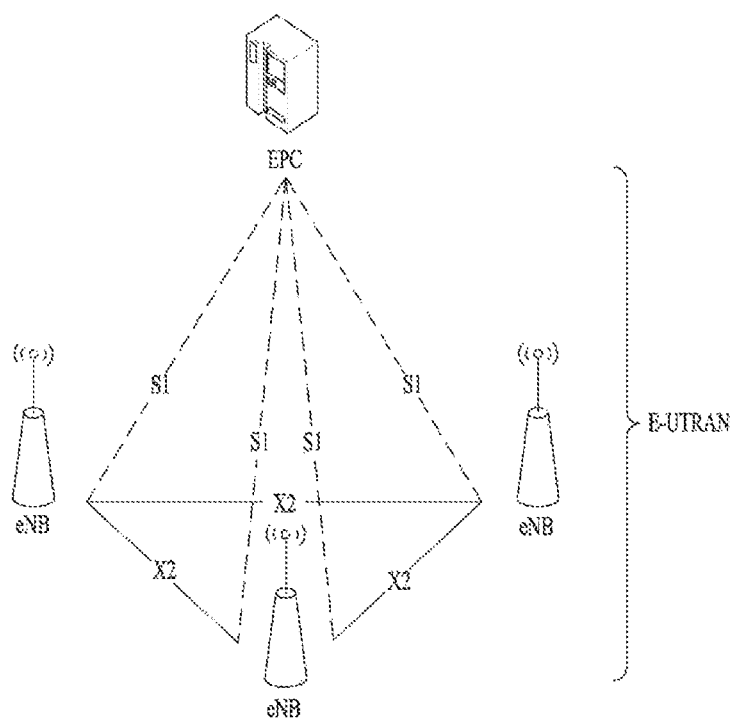
FIG. 2 illustrates a schematic structure of an Evolved Universal Terrestrial Radio Access Network (E-UTRAN)

FIG. 2 illustrates a network structure of an Evolved Universal Terrestrial Radio Access Network (E-UTRAN) system. The E-UTRAN system is an evolved version of the conventional UTRAN system. The E-UTRAN includes base stations that will also be referred to as "eNode Bs" or "eNBs".

The eNBs are connected through X2 interfaces. The X2 user plane interface (X2-U) is defined between eNBs. The X2-U interface provides nonguaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipment (UE) through a radio interface and is connected to an Evolved Packet Core (EPC) through an S1 interface. The S1 user plane interface (S1-U) is defined between the eNB and the S-GW. The S1-U interface provides nonguaranteed delivery of user plane PDUs between the eNB and the S-GW (Serving Gateway). The S1 control plane interface (e.g., S1-MME) is defined between the eNB and the MME (Mobility Management Entity). The S1 interface performs following functions: EPS (Evolved Packet System) Bearer Service Management function, NAS (Non-Access Stratum) Signaling Transport function, Network Sharing Function, MME Load balancing Function and the like.

Figure 3:
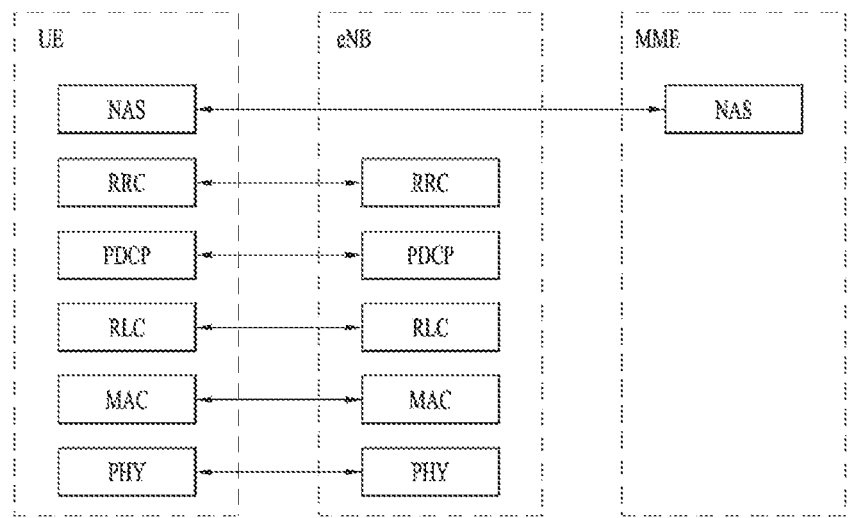
FIG. 3 illustrates the configurations of a radio interface protocol between the E-UTRAN and a UE.
Figure 3:
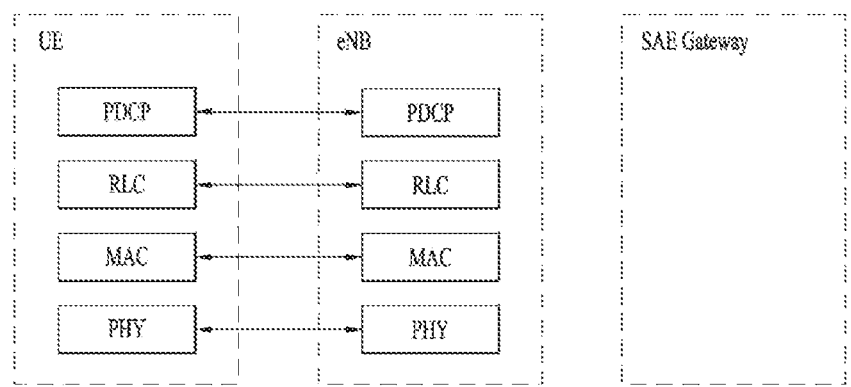

FIG. 3 illustrates the configurations of a control plane and a user plane of a radio interface protocol between the E-UTRAN and a UE based on the 3GPP radio access network standard. The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management. NAS layer situated above RRC layer performs such a function as a session management and a mobility management and the like. In the NAS layer, in order to manage mobility of a user equipment, two kinds of states EMM-REGISTERED (EPS mobility Management-REGISTERED) and EMM-DEREGISTERED are defined. These two states may apply to a user equipment and an MME. A user equipment in an early stage is in EMM-DEREGISTERED state. In order to access a network, this user equipment performs a process for registering with the corresponding network via an initial attach procedure. If the attach procedure is successfully completed, each of the user equipment and the MME enters EMM-REGISTERED states.

In order to manage a signaling connection between a user equipment and an EPC, two kinds of states ECM-IDLE (EPS connection management) and ECM-CONNECTED are defined in the NAS layer. These two states may apply to a user equipment and an MME. If a user equipment in ECM-IDLE state establishes an RRC connection with E-UTRAN, the corresponding user equipment is in ECM-CONNECTED state. If MME in ECM-ILDE establishes S1 connection with E-UTRAN, the corresponding MME enters ECM-CONNECTED state.

When a user equipment is in ECM-IDLE state, E-UTRAN may not have information (context) of the user equipment. Hence, the user equipment in ECM-IDLE state may perform a UE based mobility related procedure such as a cell selection and a cell reselection without receiving a command from a network. On the contrary, when a user equipment in ECM-CONNECTED state, mobility of the user equipment is managed by a command given by a network. If a location of a user equipment in ECM-IDLE state deviates from a location known to a network, the user equipment informs the network of a corresponding location of the user equipment through a tracking area update procedure.

One cell of the eNB is set to use a carrier bandwidth such as 1.25, 2.5, 5, 10 or 20 MHz to provide a downlink transmission or uplink reception service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

2. Vehicle to Everything (V2X) Communication

The V2X communication described in the embodiments of the present application includes four types of V2X applications, such as (i) Vehicle to Vehicle (V2V), (ii) Vehicle to Infrastructure (V2I), (iii) Vehicle to Network (V2N), and (iv) Vehicle to Pedestrian (V2P).

A V2X Service is a service where the V2X applications can be adopted and is a type of 3GPP communication service that involves a transmitting or receiving device on a vehicle. Based on the other party involved in the communication, the V2X services can be divided into V2V Service, V2I Service, V2N service and V2P Service.

Figure 4:
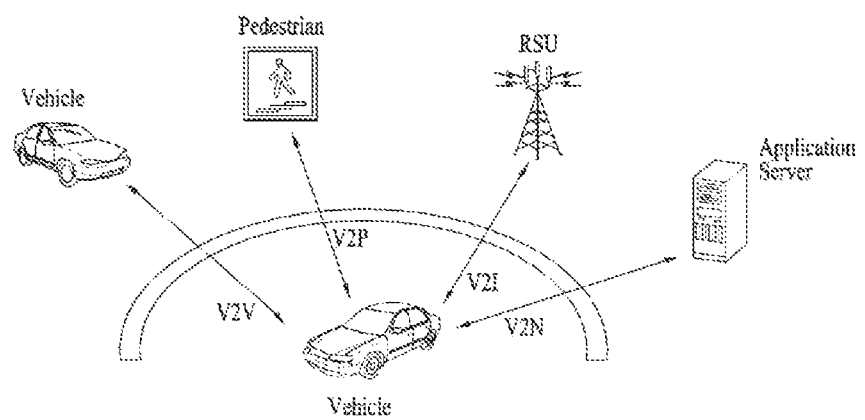
FIG. 4 illustrates types of V2X applications can be applied on embodiments of the present invention.

FIG. 4 illustrates types of V2X applications can be applied on embodiments of the present invention.

Referring to FIG. 4, the V2X communication involves serval entities such as a Road Side Unit (RSU), an Application Server, a Vehicle UE (VUE), and a Pedestrian UE (PUE). In this case, the RSU is a V2X Service enabled device that can transmit to, and receive from a moving vehicle using V2I Service, and includes a UE type RSU, an eNB-type RSU. The VUE is a V2X-enabled UE, which supports the V2X Service. The VUE can be a UE adopted on the vehicle (e.g., car, motorcycle, bicycle, or train, etc.). The PUE is also a V2X-enabled UE supporting the V2X service but is held by the pedestrian.

The V2I Service is a type of V2X Service, where one party is a vehicle (e.g., VUE) whereas the other party is entity belonging to infrastructure. The V2P Service is a type of V2X Service, where one party is a VUE whereas the other party is a PUE carried by an individual (e.g., handheld terminal carried by a pedestrian, cyclist, driver or passenger). The V2V Service is a type of V2X Service, where both parties of the communication are vehicles. The V2V Communication Range is a direct communication range between two vehicles engaged in V2V Service.

The four types of V2X applications can use "co-operative awareness" to provide more intelligent services for end-users. This means that entities, such as vehicles, roadside infrastructure (e.g., RSU etc.), application server and pedestrians, can collect knowledge of their local environment (e.g., information received from other vehicles or sensor equipment in proximity) to process and share that knowledge in order to provide more intelligent services, such as cooperative collision warning or autonomous driving.

These intelligent transportation services and the associated message sets have been defined in automotive SDOs outside 3GPP. Three basic classes of applications for providing ITS services include road safety, traffic efficiency, and other applications. In this case, 3GPP network system only handles the transport of these messages to support different types of V2X applications.

The V2V applications expect UEs that are in proximity of each other to exchange V2V application information. 3GPP transport of messages containing V2V application information requires the UE to have a valid subscription and authorization from a network operator. Transport for a valid subscriber is provided whether the UE is served or not served by E-UTRAN.

E-UTRAN allows such UEs that are in proximity of each other to exchange V2V-related information using the E-UTRAN when permission, authorization and proximity criteria are fulfilled. The proximity criteria can be configured by the operator.

The UE supporting V2V applications is able to broadcast application layer information (e.g. about its position, dynamics, and attributes as part of the V2V service). The V2V payload may be flexible in order to accommodate different information contents, and the information can be broadcasted periodically according to a configuration provided by the operator. In addition, The UE supporting V2V applications is able to transmit messages containing V2V application information (e.g. location, dynamics, and attributes). The message payloads may be flexible in order to accommodate varying amount of information.

3GPP transport of message containing V2V application information may be predominantly broadcast-based. Such 3GPP transport includes the transport between UEs directly and/or, due to the limited direct communication range, the transport between UEs via infrastructure supporting V2X communication (e.g., RSU, application server, etc.).

The UE supporting V2I applications transmits messages containing V2I application information to an RSU. An RSU transmits messages containing V2I application information to one or more UEs supporting V2I applications.

The UE supporting V2N applications communicates with an application server supporting V2N applications. Both parties communicate with each other via the EPS.

V2P applications expect UEs that are in proximity of each other to exchange V2P application information. 3GPP transport of messages containing V2P application information requires the UE to have a valid subscription and authorization from a network operator. Transport for a valid subscriber is provided whether the UE is served or not served by E-UTRAN.

The UE supporting V2P applications transmits messages containing V2P application information. It is expected that V2P application information can be transmitted either by a UE supporting V2X application in a vehicle (e.g., warning to pedestrian), or by a UE supporting V2X application associated with a vulnerable road user (e.g., warning to vehicle).

3GPP transport of messages containing V2P application information includes the transport between UEs directly and/or, due to the limited direct communication range, the transport between UEs via infrastructure supporting V2X communication, e.g., RSU, application server, etc.

Meanwhile, the main difference between 3GPP transport of messages with V2P and V2V application information is due to the properties of the UEs. A UE supporting V2P applications used by pedestrian might, for example, have lower battery capacity, the radio sensitivity might be limited, e.g. due to antenna design, and therefore it may not be able to send messages with the same periodicity as UEs supporting V2V application, and/or receive messages.

3. Methods for Transmitting Warning Notifications

Figure 5:
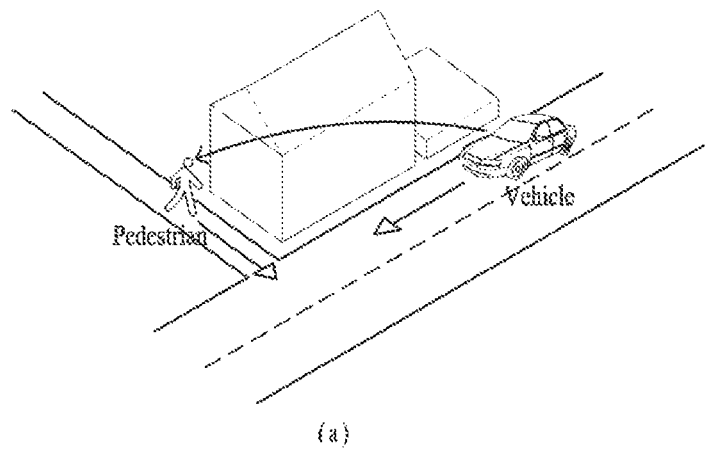
FIG. 5 illustrates V2P use cases which the warning notifications are needed.
Figure 5:
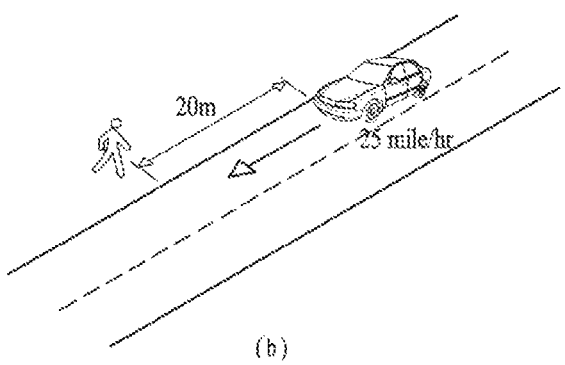
Figure 5:
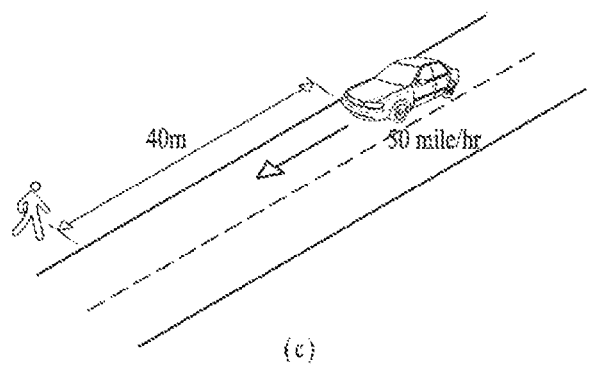

FIG. 5 illustrates V2P use cases which the warning notifications (included in a warning message) are needed.

Referring to FIG. 5(a), in the V2P use case situations, there are two different ways of warning notifications (1) warning to pedestrian and (2) warning to vehicle. The warning to pedestrian can help pedestrians (or vulnerable road users) avoid potential risks associated with vehicles moving towards or around them, such as collision, and the warning to vehicle can help drivers avoid potential risk associated with pedestrians (or vulnerable road users) walking or moving around their vehicle, such as collision.

The waring messages can be broadcast by the VUE to vulnerable road users (i.e., PUE) in the proximity. However, one problem with this V2P use case is that if the velocity (or speed) of a vehicle (UE supporting V2X Service) is high but the power level and/or frequency (how often) of V2P message transmissions (i.e., the waring notifications) are fixed, the associated vulnerable road user may face with different level of ample time to prepare for the possible collision.

For example, when a vehicle is approaching a crosswalk at a regular velocity/speed (e.g., 25 miles/hr as seen in FIG. 5(b)) where some vulnerable road users are waiting to cross, it is good enough for those users will be receiving one (1) message per unit time (see FIG. 5 (b)); however, when a vehicle is approaching the crosswalk at a higher speed (e.g., 50 miles/hr), it is necessary for those users to receive the message more frequently (to get more timely update since it's moving faster) and also to receive the message in more advance (e.g., 40 m earlier as seen in FIG. 5 (b) as compared to 20 m earlier shown in FIG. 5 (b)).

If the vehicle in FIG. 5(b) and that in FIG. 5 (c) have the same transmission power and transmission frequency for a V2X warning message, the user in FIG. 5 (c) (vehicle velocity is 25 miles/hr) may be exposed to higher level of risk of collision because her/his ample time to prepare is clearly shorter than that the user in FIG. 5 (b) has (vehicle velocity is 25 miles/hr). The user in FIG. 5 (b) and that in FIG. 5 (c) may have the similar ample time to prepare if the transmission range of vehicle in FIG. 5 (b) is twice as big as that in FIG. 5 (c).

Accordingly, it is needed to provide methods how to manage the transmission power and/or the frequency of the V2P messages to be transmitted and/or received for the warning notifications. Hereinafter, it is defied that a Message transmission Guideline Package (MGP) message used in embodiments of the present inventions, first.

3.1 Definition of the MGP Message

The MGP message is transmitted from the network to the VUE and contents of the MGP message is used for the warning messages. The MGP message can be transmitted via one of a physical layer, a medium access layer, and a radio resource control layer.

The MGP message may include geographical coordinate information which can be used by the receiving UE to request the serving network to send out supplementary information, if any, regarding the Guideline. For example, the geographical coordinate information and/or the supplementary information may include (1) velocity range class information, (2) a statistical indication which is a statistic information based indication whether that area is very densely populated area for drivers to be more careful or to pay more attention while driving by the area, and/or (3) a live indication which is a live information-based indication whether that area is very densely populated area, or populated with elderly or people who need more attention by the drivers, or busy area with careless pedestrians (e.g., university town with many street events where walking people pay more attention to the street show instead of their potential risk of accidents). The contents of the supplementary information can be also included in the MGP message. The live indication can be called a real time indication.

The MGP message may further include a Value Tag. The Value Tag indicate specific time information which the serving network can update the MGP message with specific time of the day, etc. to make an adaption of the situation even in the same area in the region (i.e., an MGP area). For example, the warning message's frequency or geographical transmission ranges may need adaptation depending on the time of the day, or special or unexpected/abnormal situations (e.g., public event or disastrous situations). If the Value Tag has been changed, the UE is supposed to request a new one or monitor the signal (i.e., the MGP) from the serving network for an update. The Value Tag can be changed when the Value Tag expires or when the UE is out of the service area of the serving cell and/or serving node. The UE is allowed to use the recently stored/used MGP even if the Value Tag is invalid; the stored MGP is invalid or expired.

If the MGP message is updated, the UE shall use updated MGP message to make a selection of transmission frequency of V2X messages and/or the transmission power. If the UE is out of the coverage, it can use the allowed MGP which is recently used or stored MGP.

Hereinafter, the embodiments of the present inventions using the MGP message are described in detail.

3.2 First Embodiment—Broadcast Manner

Figure 6:
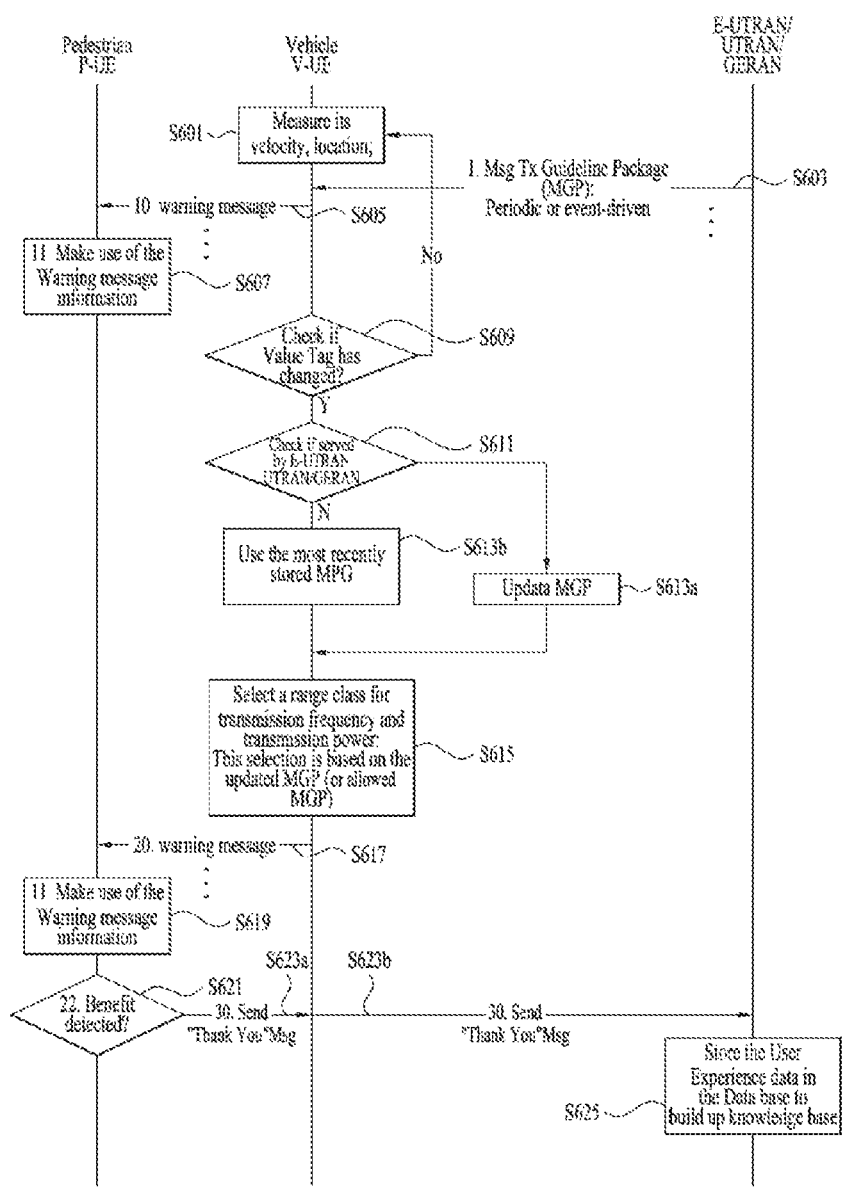
FIG. 6 illustrates a flow diagram for dynamically adapting the MGP message and the velocity range class based on the geographical coordinate information (or situational information) given by the serving network.

FIG. 6 illustrates a flow diagram for dynamically adapting the MGP message and the velocity range class based on the geographical coordinate information (or situational information) given by the serving network.

Referring to FIG. 6, the serving network entity can be one node belong to E-UTRAN, UTRAN, GERAN, or to core network. That is, the PUE and the VUE are served by E-UTRAN/UTRAN/GERAN. In addition, the interface between the VUE and the PUE is supported by the V2P service and the interface between the VUE and the serving network is supported by the V2I service discussed above second 2.

The VUE measures it's a velocity and a location, periodically or event-driven way. The VUE may broadcast the measured velocity information and the location information to its peer entity or the serving network (S601).

The serving network periodically broadcast the MGP message in a MGP area, or the MGP message is transmitted as an event-driven manner. The MGP message is used for carrying the basic or vital information related to the MGP profile (see, section 3.1). The delivery of the MGP message is a cell-specific or, more coarsely, a group of cell-specific (i.e., the same MGP is broadcast in a group of cells) (S603).

The MGP area is a geographical coverage area over which the same MGP profile (i.e., the MGP message) is delivered from the serving network (e.g., the E-UTRAN/UTRAN/GERAN) to V-UEs. For instance, an MBMS Area can be used as the MGP Area. The concept of the MGP area is a new concept even though the definition of the MBMS area is common in 3GPP LTE systems. Alternatively, the service provider (or, ITS service provider) may also define the MGP Area based on several factors, e.g., time of the day, reported event, etc. The MGP area can be updated dynamically or semi-dynamically.

If the VUE receiving the MGP message at the step of S603, the VUE transmits or broadcasts a first warning message in consideration of the MGP message, to the PUE and/or other VUEs (S605).

At the step of S605, the VUE makes the first warning message further in consideration of the measured velocity and location of the VUE at the step of S601.

The PUE and/or the other VUEs may make use of the first warning message when they are moving around the MGP area (S607).

If the VUE has received the MGP message with the Value Tag 1 (VT1), the VUE may use the received MGP message for 'nn' seconds (or measured in minutes or in hours or in units of time; for example, nn can be 1, 2, and so on; or a multiple of 60) represented by the VT1. This means that VUEs do not have to spend radio resources to continuously monitor the signal (i.e., the MGP message) from the serving network (E-UTRAN, UTRAN, GERAN, or a combination of them) for that given period of time indicated by the VT1. The VT1 can be set as the period of the MGP message or multiple of the period. Accordingly, the VUE checks the VT1 has changed or not for receiving new MGP message (S609).

Due to the nature of high speed movement of VUEs, it is possible that they may go out of the coverage area of the serving network after they have received the MGP message in step of S603. Therefore, the VUE is able to check if the VUE is served by the serving network or not (S611).

If the VUE is served by the serving network, the VUE may update the MGP message when the Value Tag (VT1) is expired or changed (S613*a*).

Due to the characteristics that VUEs have to periodically transmit V2X messages (e.g., a Cooperative Awareness Message (CAM) indicating whether the VUE exists or not, or a Decentralized Environmental Notification Message (DENM) indicating surrounding circumstances), it is advantageous that the VUEs should update the MGP message once they detected the Value Tag had changed to incorporate the changed situation into their following pattern of V2X message transmissions.

If the VUE is not served by the serving network due to a mobility of the VUE or the VUE is out of range of the serving network and it does not registered to another network yet, the VUE is able to use the most recently stored MGP message (S613*b*).

The VUE is able to select a velocity range class for transmission frequency and transmission power of the V2X messages (e.g., warning messages). The selection is based on the updated MGP message (or allowed MGP) and the measured velocity and location of the VUE. The transmission frequency indicates how frequently the V2X messages (i.e., warning message) transmissions can be occurred per unit time (S615).

At the step of S615, the updated MGP message may include geographical coordinate information for the MGP area and new value tag (i.e., VT2), if needed. The MGP message may further include velocity range class information representing the velocity range class classified according to a velocity of a VUE, a statistic indication indicating whether the area is densely populated area or not based on the statistic information, and a live indication indicating whether that area is dense or not now.

The velocity range class represents predetermined transmission frequency and/or transmission power based on a speed (or a velocity) of the VUE. For example, suppose that the MGP message has two velocity range classes, such as a class A and a class B. The class A is for those running at a velocity below 40 km/h and the class B is for those running at the velocity over 40 km/h. If the velocity of the V-UE is 35 km/h, this VUE should select the class A for determining the V2X message transmission (e.g., the frequency of transmission and the transmission power).

After then, the VUE transmits the second warning message according to the velocity range class to the PUE or another VUE (S617).

At the steps of S605 and S617, the first and the second warning messages may include at least the geographical coordinate information, the velocity range class, the statistic indication or the live indication.

The PUE or another VUE is able to make use of the information of the second warning message (S619).

In addition, the PUE and/or the VUE are able to decide the first and/or the second warning message is useful or not (S621). In order to this, the PUE transmits "Thank You" message to the VUE, and the VUE transmits the Thank you message to the serving network. The "Thank You" message is used to indicate what aspect of the warning message was helpful or not helpful. That is, the "Thank You" message can include "usefulness indication" specifically to each piece of information (e.g., the geography coordinate information, the velocity class range, the area is busy or not) of the warning messages (S623a, S623b).

The serving network (or, the service provider) can store the information of the Thank you message in the data base and build up knowledge base. The "Thank You" message can further include a location, a time of the event, a momentarily recorded audio, and/or pictures taken at the event (with prior legal agreement and with private information suitably anonymized or protected and encrypted) of the PUE and/or the VUE (S625).

3.3 Second Embodiment—UE Specific Manner

Figure 7:
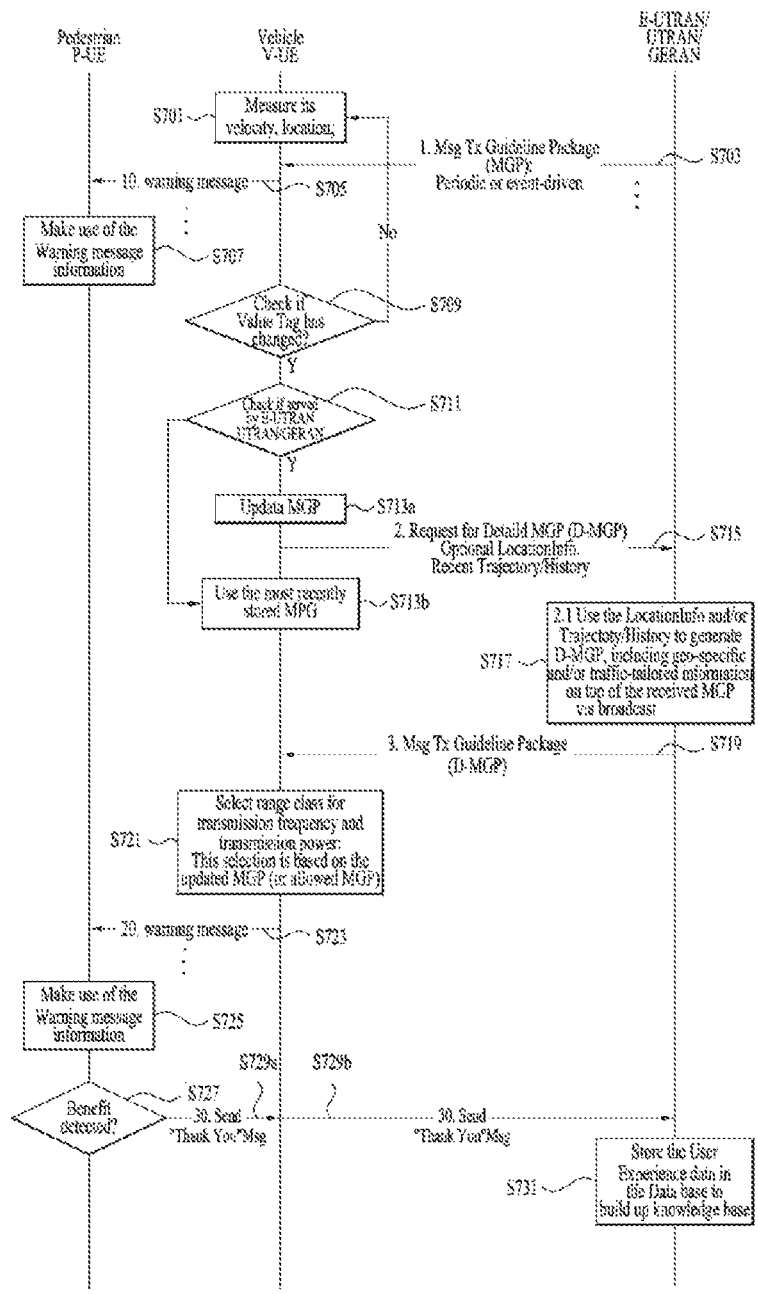
FIG. 7 illustrates a flow diagram for velocity range class adaptation with or without geographical and situational information.

FIG. 7 illustrates a flow diagram for velocity range class adaptation with or without geographical and situational information.

FIG. 7 depicts the case that detailed information is requested by the VUE to the serving network (i.e., E-UTRAN node(s)). The detailed information, called Dedicated MGP (D-MGP), includes location information and/or trajectory/history of the sender (i.e., the VUE), geo-specific information (e.g., campus area, urban area, etc.), traffic condition information (e.g., heavy user density or heavy traffic jam, etc.) for specific area and so on.

Referring to FIG. 7, the serving network entity can be one node belonging to E-UTRAN, UTRAN, GERAN, or to core network. That is, the PUE and the VUE are served by E-UTRAN/UTRAN/GERAN. In addition, the interface between the VUE and the PUE is supported by the V2P service and the interface between the VUE and the serving network is supported by the V2I service discussed above second 2.

The VUE measures it's a velocity and a location, periodically or event-driven way. The VUE may broadcast the measured velocity information and the location information to its peer entity or the serving network (S701).

The serving network periodically broadcast the MGP message (or the first MGP message) in a MGP area, or the MGP message is transmitted as an event-driven manner The MGP message is used for carrying the basic or vital information related to the MGP profile (see, section 3.1). The delivery of the MGP message is a cell-specific or, more coarsely, a group of cell-specific (i.e., the same MGP is broadcast in a group of cells) (S703).

The MGP area is a geographical coverage area over which the same MGP profile (i.e., the MGP message) is delivered from the serving network to V-UEs (refer to section 3.2).

If the VUE receiving the MGP message at the step of S703, the VUE transmits or broadcasts a first warning message in consideration of the MGP message, to the PUE and/or other VUEs (S705).

At the step of S705, the VUE make the first warning message further in consideration of the measured velocity and location of the VUE at the step of S701.

The PUE and/or the other VUEs may make use of the first warning message when they are moving around the MGP area (S707).

If the VUE has received the MGP message with the Value Tag 1 (VT1), the VUE may use the received MGP message for 'nn' seconds (or measured in minutes or in hours or in units of time; for example, nn can be 1, 2, and so on, or a multiple of 60) represented by the VT1. This means that VUEs do not have to spend radio resources to continuously monitor the signal (i.e., the MGP message) from the serving network (E-UTRAN, UTRAN, GERAN, or a combination of them) for that given period of time indicated by the VT1. The VT1 can be set as the period of the MGP message or multiple of the period. Accordingly, the VUE checks the VT1 has changed or not for receiving new MGP message (S709).

Due to the nature of high speed movement of VUEs, it is possible that they may go out of the coverage area of the serving network after they have received the MGP message in step of S703. Therefore, the VUE is able to check if the VUE is served by the serving network or not (S711).

If the VUE is served by the serving network, the VUE may update the MGP message when the Value Tag (VT1) is expired or changed (S713a).

Due to the characteristics that VUEs have to periodically transmit V2X messages (e.g., a Cooperative Awareness Message (CAM) indicating whether the VUE exists or not, or a Decentralized Environmental Notification Message (DENM) indicating surrounding circumstances), it is advantageous that the VUEs should update the MGP message once they detected the Value Tag had changed to incorporate the changed situation into their following pattern of V2X message transmissions.

If the VUE is not served by the serving network due to a mobility of the VUE or the VUE is out of range of the serving network and it does not registered to another network yet, the VUE is able to use the most recently stored MGP message (S713b).

The step S713a can be periodically performed according to the periodicity of the MGP message and/or the VT1. However, when the VUE needs detail information on a sub-MGP area, the VUE is able to transmit a Detailed MGP (D-MGP) request message requesting a D-MGP message. The D-MGP request message may include the location information of current location of the VUE and trajectory/history information of the VUE (S715).

Figure 8:
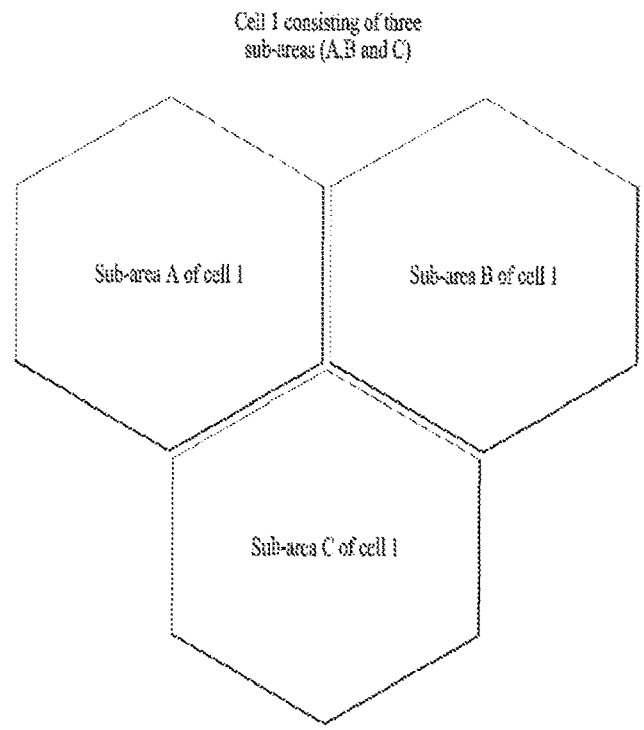
FIG. 8 illustrates a serving cell consisting of three sub-areas, such as a sub-area A, and a sub-area B and a sub-area C.

To explain a concept of the sub-MGP area, FIG. 8 can be referred. FIG. 8 illustrates a serving cell consisting of three sub-areas, such as a sub-area A, and a sub-area B and a sub-area C. Even though FIG. 8 illustrates only three sub-areas exist on the serving cell but the more sub-areas can be deployed on the serving cell. In this case, the serving cell 1 depicted on FIG. 8 can be replaced with the MGP area and the eNB can be replaced with the serving network. The MGP area includes three MGP sub-areas.

For the MGP, the eNB (or, the serving network) covering the MGP area sends MGP information (i.e., the MGP message) to those V-UE's residing in the cell. However, in D-MGP, the MGP information is more detailed. In this case, the D-MGP message is not regularly sent by the eNB to V-UE(s) but is sent when the VUE requests. When the VUE sends the D-MGP request message, the V-UE includes the "location information" and/or "trajectory history" of the VUE to send it to the eNB. Based on the received location information and/or the trajectory history information, the eNB can select "detailed information" specifically about the location (e.g., the MGP sub-area A of cell 1).

For example, if a V-UE residing in the MGP sub-area of the cell 1 requests the D-MGP message to the eNB, this eNB will try to find if there is detailed information available specifically to the MGP sub-area 1 (instead of checking general information for the whole MGP area or the serving cell area) to send to the requesting V-UE. This V-UE will get more detailed information, if any, specifically related to that MGP sub-area (in close proximity of the V-UE).

In a mechanism with MGP only (as opposed to that with D-MGP), the V-UE can receive the cell-specific information (or MGP area information) only but cannot receive more detailed information no matter where in the cell the VUE is currently located. However, in a mechanism with D-MGP, this V-UE can get more information in its close proximity.

The serving cell (or the MGP area) can be categorized into a single or a number of sub-areas. If a MGP sub-area has different characteristics (e.g., sub-area A: school zone with a speed limit of 40 km/hr) than another MGP sub-area of this MGP area (e.g., sub-area B: drive way connecting this school zone to another, where the speed limit is more liberal, e.g., 100 km/hr), the D-MGP based mechanism can provide differentiated information (e.g., message transmission parameters customized to 40 km/hr in the MGP sub-area A whereas the parameters customized to 100 km/hr in the MGP sub-area B) to the VUE which the MGP based mechanism cannot provide (i.e., parameter values customized to a combination of those speed limits in the cell).

Referring back to FIG. 7, when the serving network receives the D-MGP request message, the serving network generates a D-MGP message based on the location information and/or the trajectory information (S717).

In the step of S717, the serving network (e.g., the related node in E-UTRAN, the ITS server, or an Application layer node associated with the V2X service) may use the location information of the reporting UE (V-UE) and/or the trajectory/history information for the past [n] seconds (or measured in minutes or in hours, or in some specified unit time; [n] is an integer value; for example, 1, 2, and so on, or a multiple of 60) in order to provide geo-specific and/or traffic-tailored MGP information for the VUE. Even if two different VUEs are in the same MGP sub-area, they may need different MGP profiles if one is located in a busy area of the MGP sub-area whereas the other is not. Also, even if the reported locations of two different VUEs are the same, they may require different MGP profiles if they are moving in the opposite direction.

The serving network transmits the D-MGP message to the specific VUE which transmitted the D-MGP request message (S719).

At the step of S719, the D-MGP message may include geographical coordinate information for the MGP sub-area and new value tag (i.e., VT2), if needed. The MGP sub-area can be determined based on the location information of the D-MGP request message. The D-MGP message may further include velocity range class information representing the velocity range class classified according to a velocity of a VUE, a statistic indication indicating whether the MGP sub-area is densely populated area or not based on the statistic information, and a live indication indicating whether the MGP sub-area is dense or not now.

The VUE is able to select a velocity range class for transmission frequency and transmission power of the V2X messages (e.g., warning messages). The selection is based on the D-MGP message (or allowed MGP) and the measured velocity and location of the VUE. The transmission frequency indicates how frequently the V2X messages (i.e., warning message) transmissions can be occurred per unit time (S721).

The velocity range class represents predetermined transmission frequency and/or transmission power based on a speed (or a velocity) of the VUE. For example, suppose that the D-MGP message has two velocity range classes, such as a class A and a class B. The class A is for those running at a velocity below 40 km/h and the class B is for those running at the velocity over 40 km/h. If the velocity of the V-UE is 35 km/h, this VUE should select the class A for determining the V2X message transmission (e.g., the frequency of transmission and the transmission power).

After then, the VUE transmits the second warning message according to the velocity range class to the PUE or another VUE (S723).

At the steps of S705 and S723, the first and the second warning messages may include at least the geographical coordinate information, the velocity range class, the statistic indication or the live indication of the MGP sub-area.

The PUE or another VUE is able to make use of the information of the second warning message (S725).

In addition, the PUE and/or the VUE are able to decide the first and/or the second warning message is useful or not (S727). In order to this, the PUE transmits "Thank You" message to the VUE, and the VUE transmits the Thank you message to the serving network. The "Thank You" message is used to indicate what aspect of the warning message was helpful or not helpful. That is, the "Thank You" message can include "usefulness indication" specifically to each piece of information (e.g., the geography coordinate information, the velocity class range, the area is busy or not) of the warning messages (S729*a*, S729*b*).

The steps S729*a*, S729*b* can be done every time the PUE or the VUE has received the V2X message (i.e., the warning message) or done at every n-th reception of the V2X message.

The serving network (or, the service provider) can store the information of the Thank you message in the data base and build up knowledge base. The "Thank You" message can further include a location, a time of the event, a momentarily recorded audio, and/or pictures taken at the event (with prior legal agreement and with private information suitably anonymized or protected and encrypted) of the PUE and/or the VUE (S731).

Figure 9:
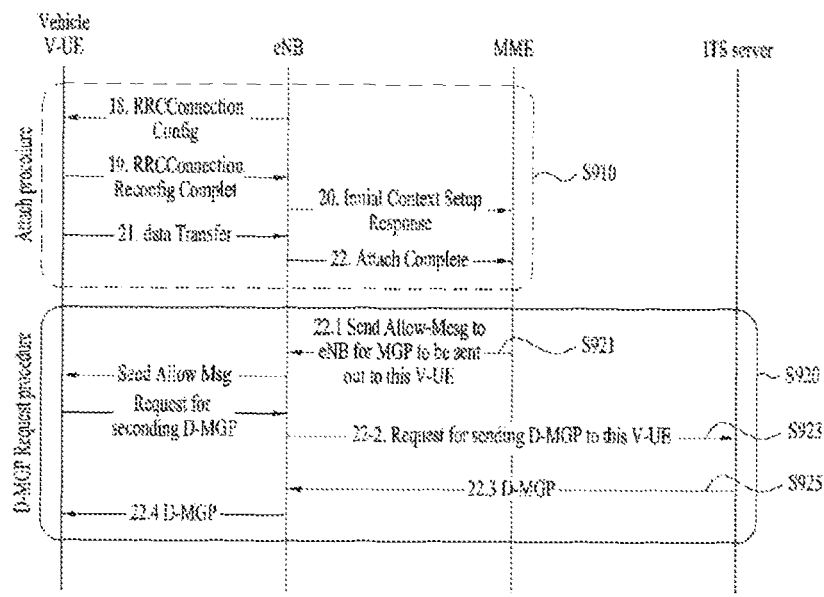
FIG. 9 illustrates another D-MGP request procedure which can be applied to the embodiments of the present invention.

FIG. 9 illustrates another D-MGP request procedure which can be applied to the embodiments of the present invention.

The D-MGP request procedure is performed after completion of an Attach Procedure (3GPP TS 23.401 Core Network Protocol, S910). The round-box (the dotted line) of FIG. 9 denotes the latter part of the Attach Procedure and the following round-box (the solid line) denotes the D-MGP Request Procedure (S920).

The Attach procedure can be performed when the VUE has been attached to the serving network. The explanation of the Attach procedure can be referred to one of the 3GPP TS 2.401 standard documents. The D-MGP Request Procedure is performed after the Attach Procedure has been complete.

The only difference between the D-MGP Request procedure shown in FIG. 7 (steps S715-S719) and the D-MGP request procedure in FIG. 9 is that the VUE will be given the D-MGP message at the time of the Attach Procedure completion (as in FIG. 9) but it will continue to receive the D-MGP message while in operation (as in FIG. 7). The procedure shown in FIG. 7 can be performed for both of VUEs in RRC Connected mode and the VUEs not in RRC Connected mode. In addition, the details do not explained for FIG. 9 can be referred to those of FIG. 7.

Referring to FIG. 9, after the Attach procedure has been completed, the MME transmits an allow message to the eNB for MGP to be sent out to the VUE (S921).

If the VUE receives the allow message, the VUE transmits request for sending D-MGP message to the eNB. The eNB transfers the request for sending D-MGP message to the ITS server. The request for sending D-MGP message may include the location information of current location of the VUE and trajectory/history information of the VUE (S923).

When the ITS server receives the request for sending the D-MGP message, the ITS server generates a D-MGP message based on the location information and/or the trajectory information and ITS server transmits the D-MGP message to the specific VUE which transmitted the request for sending D-MGP message (S925).

In the step of S925, the ITS server may use the location information of the reporting UE (V-UE) and/or the trajectory/history information for the past [n] seconds (or measured in minutes or in hours, or in some specified unit time; [n] is an integer value) in order to provide geo-specific and/or traffic-tailored MGP information for the VUE.

3.4 Transmission Power Calculation

Hereinafter the methods how to calculate the transmission power at the steps of S615 and S721 of the embodiments are explained in detail.

The received power may be calculated according to following Math Figure 1.

$$R(s) = \{beta\} * P\_0 * [1/(s)^{\{alpha\}}] \quad \text{[Math Figure 1]}$$

In Math Figure 1, R(s) represents the received power of a reference transmission with original transmission power of P when the distance between the transmitter and the receiver is measured or assumed "s". In addition, {alpha} represents a path loss exponent (which is 2 in vacuum environment) and {beta} is a proportional coefficient, which is positive, characterized by many factors, such as frequency and antenna gains. The MGP or the D-MGP message may include the value for {alpha} and {beta}.

The moving distance of the VUE at speed "v" for a time period "t" is given by following Math Figure 2.

$$S = V * t \quad \text{[Math Figure 2]}$$

Therefore, with the reference cases (s_1=v_1*t, and s_2=v_2*t), the received power of s_1 and s_2 can be calculated as following Math Figure 3.

$$R(s\_1) = \{beta\} * P\_1 * [1/(s\_1)^{\{alpha\}}],$$

$$R(s\_2) = \{beta\} * P\_2 * [1/(s\_2)^{\{alpha\}}] \quad \text{[Math Figure 3]}$$

In order for the driver (e.g., VUE) or pedestrian (e.g., PUE) to get prepared by giving them ample time "t" as in the reference cases, the following relation should be satisfied: R(s_1)=R(s_2). In addition, this gives P_2=P_1*[{s_2/s_1}^{alpha}] and the is rewritten as P_2=P_1*[{v_2/v_1}^{alpha}].

For example, given the reference velocity of 25 miles/hr and transmission power 5 mW, a VUE moving at a velocity of 50 miles/hr is expected to use the transmission power as: P_2={beta}*5 mW*{50/25}^{alpha}.

If the path loss exponent is given by 2.0 and beta by 1.0, the advised transmission power of the VUE is P_2=1.0*2^2*5 mW=20 mW.

This method for calculating the transmission power of a certain speed level can be used to find out the maximum power that the VUE can use for V2X message transmission.

3.5 Transmission Frequency Calculation

Hereinafter the methods how to calculate the transmission frequency at the steps of S615 and S721 of the embodiments are explained in detail.

Figure 10:
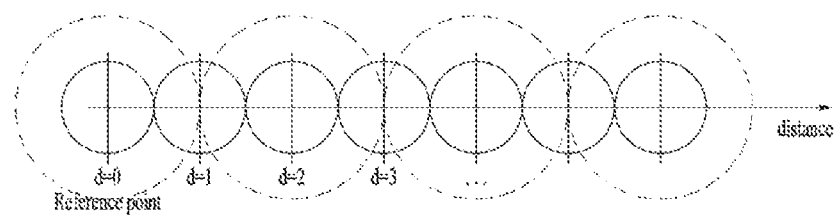
FIG. 10 illustrates the transmission range of the VUE according to its velocity.

FIG. 10 illustrates the transmission range of the VUE according to its velocity.

Referring to FIG. 10, it is assumed that the solid circle depicts the transmission range of a VUE moving at a speed of v1=25 miles/hr whereas the dotted circle does the transmission range of a VUE moving at a speed of v2=50 miles/hr given that their transmission frequencies (i.e., period of transmission) are the same (e.g., every "t" miliseconds)

Consider a case that the reference VUE has been moving at a speed of 25 miles/hr (as shown in FIG. 10), with a V2X message transmission frequency of 400 ms. Suppose that this VUE has changed the speed onto a speed of 50 miles/hr. The above described method to adjust the transmission power may result in (2^{alpha}) as large as the transmission power used when the vehicle was moving at 25 miles/hr.

However, what if the VUE is required to or if the VUE intentionally needs to maintain the transmission power lower than a certain threshold value, e.g., smaller than (2^{alpha})? In this type of cases, the transmission power restriction converts to increase of the V2X message transmission frequency. For example, if the VUE is in the situation not being allowed to increase the transmission power from the level it used to use although the speed has increased, the V2X message transmission frequency should be approximately doubled to maintain the same or comparable length of time for pedestrians or drivers to prepare to stop or react.

3.6 Joint Control of Transmission Power and Transmission Frequency

Including the aforementioned cases (sections 3.4 and 3.5) for transmission power adaptation or transmission frequency (i.e., how frequently message transmissions occur per unit time (e.g., one second)) adaptation alone, the V2X message transmission frequency and the transmission power level can be jointly controlled in practical situations. This type of joint control is useful in practical situations, for example, when the transmission power for V2X message transmission is bounded, i.e., when it has an upper bound (e.g., x mW).

4. Apparatuses for Implementing the Aforementioned Methods

Figure 11:
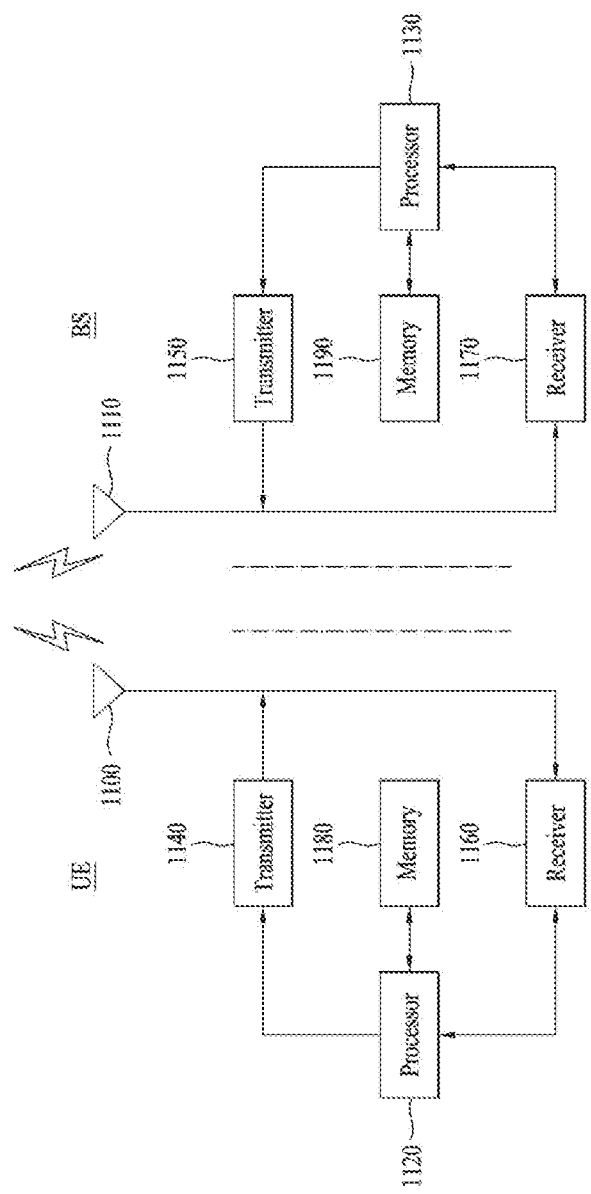
FIG. 11 shows apparatuses for implementing the above-mentioned methods described with reference to FIGS. 1 to 10.

FIG. 11 shows apparatuses for implementing the above-mentioned methods described with reference to FIGS. 1 to 10.

A UE can serve as a transmitting end on uplink and as a receiving end on downlink. An eNB can serve as a receiving end on uplink and as a transmitting end on downlink.

The UE and the eNB may include a transmitter 1140 and 1150 and receiver 1160 and 1170 for controlling transmission and reception of signal, data and/or messages and antennas 1100 and 1110 for transmitting and receiving signal, data and/or messages, respectively.

In addition, the UE and the eNB may respectively include processors 1120 and 1130 for performing the above-described embodiments of the present invention and memories

1170 and 1190 for storing processing procedures of the processors temporarily or continuously.

The embodiments of the present invention can be performed using the aforementioned components and functions of the UE and the eNB. The apparatuses shown in FIG. 11 may be one of members illustrated in FIGS. 1, 2 and 4. For example, the eNB in FIG. 11 can be referred to the serving network with the RSU (or, E-UTRAN, ITS server etc.) and the UE in FIG. 11 can be referred to one of the PUEs or VUEs.

The processor of the VUE controls the receiver and the transmitter to transmit the warning message. Wherein the processor of the VUE is configured to: control the receiver to receive a first Message transmission Guideline Package (MGP) message including geographical coordination information related with a MGP area and a value tag indicating time information for updating the MGP message, check the value tag is changed or not, and control the transmitter to transmit a first warning message based on the first MGP message when the value tag is not expired; or control the transmitter to transmit a second warning message based on a second MGP message when the value tag is expired, wherein at least a transmission frequency or a transmission power for the second warning message are determined base on the second MGP message, and wherein the MGP area represents where MGP profiles are the same. The processor of the VUE may check its location is in a serving network or not, and the second warning message may be transmitted based on a most recently stored MGP message, when the VUE is out of a coverage of the serving network and the value tag is not expired. The MGP message may further include a velocity range class information representing a velocity range class classified according to a velocity of a VUE, a statistic indication indicating whether the MGP area is densely populated area or not based on statistic information, and a live indication indicating whether that MGP area is dense or not now. In this case, the at least the transmission power and the transmission frequency is determined according to the velocity range class information in consideration of a velocity of the VUE. The VUE may transmit a detailed MGP (D-MGP) request message including at least location information or trajectory information of the VUE, and the second MGP message may be a D-MGP message including geographical coordination information related with a MGP sub-area and a new value tag. The transmission frequency may be calculated based on a velocity of the VUE and a velocity of another VUE or a pedestrian UE (PUE). In addition, the transmission power may be calculated by using a velocity of the VUE, a velocity of another VUE or a pedestrian UE (PUE), a transmission power of the another VUE or the PUE, a path loss exponent parameter, and a a proportional coefficient parameter. The VUE may transmit a Thank you message indicating what aspect of the first or the second warning messages is helpful or not helpful. The specific embodiments by performing the VUEs and the eNB can be referred to the embodiments explained above.

The transmitter 1140 and 1150 and the receiver 1160 and 1170 included in the UE and the eNB can have packet modulation and demodulation functions, a fast packet channel coding function, an OFDMA packet scheduling function, a TDD packet scheduling function and/or a channel multiplexing function. In addition, the UE and the eNB may further include a low-power radio frequency (RF)/intermediate frequency (IF) module.

In the embodiments of the present invention can use a personal digital assistant (PDA), a cellular phone, a personal communication service (PCS) phone, a global system for mobile (GSM) phone, a wideband CDMA (WCDMA) phone, a mobile broadband system (MBS) phone, a handheld PC, a notebook PC, a smart phone, a multi-mode multi-band (MM-MB) terminal or the like as the UE.

Here, the smart phone is a terminal having advantages of both a mobile communication terminal and a PDA. The smart phone can be a mobile communication terminal having scheduling and data communication functions including facsimile transmission/reception, Internet access, etc. of the PDA. The MM-MB terminal means a terminal including a multi-modem chip, which can be operated in both a portable Internet system and a mobile communication system (e.g., CDMA 2000 system, WCDMA system, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the technical feature or scope of the invention. Thus, it is intended that the present invention cover the modifications and variations of this invention provided they come within the scope of the appended claims and their equivalents.

INDUSTRIAL APPLICABILITY

The embodiments of the present invention may be applied to various wireless access systems. The wireless access systems include 3GPP and/or 3GPP2 system, etc. The embodiments of the present invention may be applied to technical fields using the various wireless access systems in addition to the wireless access systems.

What is claimed is:

1. A method for transmitting a warning message by a vehicle user equipment (VUE) in a wireless access system supporting a Vehicle to Everything (V2X) service, the method comprising:

receiving a first Message transmission Guideline Package (MGP) message including geographical coordination information related with an MGP area and a value tag for updating the first MGP message; and when the value tag is not changed, transmitting a first warning message based on the first MGP message; or when the value tag is changed, updating the first MGP message to a second MGP message and transmitting a second warning message based on the second MGP message, wherein at least one of a transmission frequency or a transmission power for the second warning message is determined based on the second MGP message, wherein the MGP area represents where MGP profiles are the same, and wherein the first MGP message further includes velocity range class information representing a velocity range class classified according to a velocity of the VUE, first MGP area information representing whether the MGP area is densely populated area or not based on statistic information, and second MGP area information representing whether the MGP area is dense or not now.

2. The method according to claim 1, wherein the VUE checks whether its location is in a serving network or not, and wherein the second warning message is transmitted based on a most recently stored MGP message, when the VUE is out of a coverage of the serving network and the value tag is not changed.

3. The method according to claim 1, wherein the at least one of the transmission power or the transmission frequency is determined according to the velocity range class information in consideration of the velocity of the VUE.

4. The method according to claim 1, wherein the VUE transmits a detailed MGP (D-MGP) request message including at least one of location information or trajectory information of the VUE, and wherein the second MGP message is a D-MGP message including geographical coordination information related with a MGP sub-area and a new value tag.

5. The method according to claim 4, wherein the transmission frequency is calculated based on the velocity of the VUE and a velocity of another VUE or a pedestrian UE (PUE).

6. The method according to claim 4, wherein the transmission power is calculated by using the velocity of the VUE, a velocity of another VUE or a pedestrian UE (PUE), a transmission power of the other VUE or the PUE, a path loss exponent parameter, and a proportional coefficient parameter.

7. The method according to claim 1, where the VUE transmits a 'Thank You' message representing what aspect of the first or the second warning messages is helpful or not helpful.

8. A vehicle user equipment (VUE) for transmitting a warning message in a wireless access system supporting a Vehicle to Everything (V2X) service, the VUE comprising:
   a receiver;
   a transmitter; and
   a processor configured to control the receiver and the transmitter to transmit the warning message,
   wherein the processor is configured to:
   control the receiver to receive a first Message transmission Guideline Package (MGP) message including geographical coordination information related with an MGP area and a value tag for updating the first MGP message; and when the value tag is not changed, control the transmitter to transmit a first warning message based on the first MGP message; or when the value tag is changed, update the first MGP message to a second MGP message and control the transmitter to transmit a second warning message based on the second MGP message, wherein at least one of a transmission frequency or a transmission power for the second warning message is determined based on the second MGP message, wherein the MGP area represents where MGP profiles are the same, and wherein the first MGP message further includes velocity range class information representing a velocity range class classified according to a velocity of the VUE, first MGP area information representing whether the MGP area is densely populated area or not based on statistic information, and second MGP area information representing whether the MGP area is dense or not now.

9. The VUE according to claim 8, wherein the VUE checks whether its location is in a serving network or not, and wherein the second warning message is transmitted based on a most recently stored MGP message, when the VUE is out of a coverage of the serving network and the value tag is not changed.

10. The VUE according to claim 8, wherein the at least one of the transmission power or the transmission frequency is determined according to the velocity range class information in consideration of the velocity of the VUE.

11. The VUE according to claim 8, wherein the VUE transmits a detailed MGP (D-MGP) request message including at least one of location information or trajectory information of the VUE, and wherein the second MGP message is a D-MGP message including geographical coordination information related with a MGP sub-area and a new value tag.

12. The VUE according to claim 11, wherein the transmission frequency is calculated based on the velocity of the VUE and a velocity of another VUE or a pedestrian UE (PUE).

13. The VUE according to claim 11, wherein the transmission power is calculated by using the velocity of the VUE, a velocity of another VUE or a pedestrian UE (PUE), a transmission power of the other VUE or the PUE, a path loss exponent parameter, and a proportional coefficient parameter.

14. The VUE according to claim 8, where the VUE transmits a 'Thank You' message representing what aspect of the first or the second warning messages is helpful or not helpful.

* * * * *